United States Patent
Jiang et al.

(10) Patent No.: US 9,473,407 B2
(45) Date of Patent: Oct. 18, 2016

(54) TRAFFIC CONTROLLING METHOD AND DEVICE BASED ON REMOTE APPLICATION

(71) Applicant: Sangfor Technologies Company Limited, Shenzhen, Guangdong (CN)

(72) Inventors: Zhengwen Jiang, Guangdong (CN); Xin Mao, Guangdong (CN)

(73) Assignee: SANGFOR TECHNOLOGIES COMPANY LIMITED, Shenzhen (CN)

( * ) Notice: Subject to any disclaimer, the term of this patent is extended or adjusted under 35 U.S.C. 154(b) by 213 days.

(21) Appl. No.: 14/058,314

(22) Filed: Oct. 21, 2013

(65) Prior Publication Data

US 2014/0112129 A1    Apr. 24, 2014

(30) Foreign Application Priority Data

Oct. 23, 2012    (CN) .......................... 2012 1 0407113

(51) Int. Cl.
*H04L 12/801* (2013.01)
*H04N 21/24* (2011.01)
*H04N 21/238* (2011.01)

(52) U.S. Cl.
CPC ............ *H04L 47/12* (2013.01); *H04N 21/238* (2013.01); *H04N 21/24* (2013.01); *H04N 21/2402* (2013.01)

(58) Field of Classification Search
CPC .... H04L 47/12; H04N 21/238; H04N 21/24; H04N 21/24
See application file for complete search history.

(56) References Cited

U.S. PATENT DOCUMENTS

| | | | | |
|---|---|---|---|---|
| 2006/0206820 | A1* | 9/2006 | Bullard | H04L 69/04 715/733 |
| 2008/0002676 | A1* | 1/2008 | Wiley | H04L 29/06027 370/356 |
| 2008/0225728 | A1* | 9/2008 | Plamondon | H04L 47/10 370/237 |
| 2013/0029632 | A1* | 1/2013 | Tiwari | H04W 12/06 455/404.1 |
| 2013/0135337 | A1* | 5/2013 | Matsui | G09G 5/02 345/593 |

FOREIGN PATENT DOCUMENTS

| | | |
|---|---|---|
| CN | 1889673 A | 1/2007 |
| CN | 101552722 A | 10/2009 |

OTHER PUBLICATIONS

Search Report of Chinese Patent Application No. 201210407113.4.

* cited by examiner

*Primary Examiner* — Marsha D. Banks Harold
*Assistant Examiner* — Walter Divito

(57) ABSTRACT

The present disclosure provides a traffic controlling method based on remote applications, comprising the following steps: evaluating a current network bandwidth; detecting a bitmap updating frequency of each area in a current screen, identifying a multimedia area, and judging whether the multimedia area is valid or not to obtain a judging result; and controlling data traffic according to the current network bandwidth and the judging result. By evaluating the current network bandwidth, detecting the updating frequency of each area in the current screen and identifying whether the multimedia area is valid, and dynamically controlling the data traffic according to the current network bandwidth and according to whether the multimedia area is valid, the present disclosure is capable of ensuring the unblocked transmission of the critical business and preventing the display quality of the multimedia area from being affected to improve the system performance and the user experience.

4 Claims, 2 Drawing Sheets

TRAFFIC CONTROLLING METHOD AND DEVICE BASED ON REMOTE APPLICATION

CROSS-REFERENCE TO RELATED APPLICATIONS

This Non-provisional application claims priority of Chinese Patent Application No. 201210407113.4 filed on Oct. 23, 2012, the entire contents of which are hereby incorporated by reference.

BACKGROUND

1. Technical Field

The present disclosure relates to Internet technologies, and particularly, to a traffic controlling method and a traffic controlling device based on remote applications.

2. Description of Related Art

With the development of Internet technology, realizing mobile officing via RAPP (RemoteApp) has become a basic need to more and more officers. Since the RAPP technology has many advantages over the traditional CS (Client-Server) deployment method, such as safer data transmission, less-occupied network bandwidth, and simpler deployment and maintenance. In virtualizations of remote applications, screen updating information is transmitted to a client side as images. While in rich media such as scenes having a number of videos, animations, and images, the transmission of the screen updating information has almost occupied all the network bandwidth, which affects the normal interactions between the remote applications.

In light of the above problem, the following ways are provided to solve the problem conventionally: ① content redirection technology: transmitting the videos or animations in the server to the client side in original coded formats, and decoding and rendering the videos and animations in the client side; this technology puts forward high requirements of the performance to the client side and an occupancy rate of the network bandwidth is high for redirecting the contents of videos or animations having low resolutions; ② prevention of displays of the videos or animations, which affects the user experience and lacks generality; ③ acceleration technology of transport layer protocol: optimizing the transport layer, optimizing the TCP (Transmission Control Protocol) congestion control algorithm, or replacing TCP with UDP (User Datagram Protocol); however, this technology cannot reduce the network bandwidth or leaves limited space for improvement; ④ united limitation of frame rates: limiting the frame rates outputted from the remote application; however, this technology cannot optimize the data in real multi-media screen areas independently, which may decrease the user experience.

SUMMARY

The main object of the present disclosure is to provide a traffic controlling method and device based on remote applications for solving the problem that the remote application cannot perform normal interaction in rich media situations or further for improving user experience.

The traffic controlling method based on remote applications provided in the present disclosure includes the following steps:
evaluating a current network bandwidth;
detecting a bitmap updating frequency of each area in a current screen, identifying a multimedia area, and judging whether the multimedia area is valid or not to obtain a judging result; and
controlling data traffic according to the current network bandwidth and the judging result.

Preferably, the step of evaluating a current network bandwidth includes:
evaluating the current network bandwidth according to an amount of data transmitted in a TCP transport layer in a predetermined period of time and according to whether there has been a congestion in the TCP transport layer;
comparing an amount of data that is currently being outputted from the current network and a threshold value of the current network bandwidth; and
if the amount of data currently being outputted is greater than the threshold value, filtering non-critical contents currently being transmitted.

Preferably, the step of controlling data traffic according to the current network bandwidth and the judging result includes:
if an evaluating result of the current network bandwidth indicates that non-critical contents currently being transmitted are needed to be filtered, optimizing contents of the multimedia area according to the judging result.

Preferably, the judging result includes: the multimedia area is valid and the multimedia area is invalid.

Preferably, the step of optimizing contents of the multimedia area according to the judging result includes:
if the multimedia area is valid, filtering the non-critical contents outside the valid multimedia area;
if the multimedia area is invalid, performing multi-frame merging and compression to the contents of the invalid multimedia area, simultaneously initializing a timer and transmitting the processed data after the timer reaches a predetermined time.

The traffic controlling device based on remote applications provided in the present disclosure includes one or more programs stored in a storage system and executed by at least one processor; the one or more programs include:
a bandwidth evaluating module configured for evaluating a current network bandwidth;
a multimedia detecting module configured for detecting a bitmap updating frequency of each area in a current screen, identifying a multimedia area, and judging whether the multimedia is valid to obtain a judging result; and
a traffic controlling module configured for controlling data traffic according to the current network bandwidth and the judging result.

Preferably, the bandwidth evaluating module is specifically used for:
evaluating the current network bandwidth according to an amount of data transmitted in a TCP transport layer in a predetermined period of time and according to whether there has been a congestion in the TCP transport layer;
comparing an amount of data that is currently being outputted from the network and a threshold value of the current network bandwidth; and
if the amount of data currently being outputted is greater than the threshold value, filtering non-critical contents currently being transmitted.

Preferably, the traffic controlling module is specifically used for optimizing the contents of the multimedia area according to the judging result if a valuating result of the current network bandwidth indicates that non-critical contents currently being transmitted are needed to be filtered.

Preferably, the judging result of the multimedia detecting module includes: the multimedia area is valid and the multimedia area is invalid.

Preferably, the traffic controlling module optimizes the contents of the multimedia area according to the judging result includes:

if the multimedia area is valid, the traffic controlling module filters the non-critical contents outside the valid multimedia area; and if the multimedia area is invalid, the traffic controlling module performs multi-frame merging and compression to the contents of the invalid multimedia area, simultaneously initializes a timer, and transmits the processed data after the timer reaches the predetermined time.

By evaluating the current network bandwidth, detecting the updating frequency of each area in the current screen and identifying whether the multimedia area is valid, and dynamically controlling the data traffic according to the current network bandwidth and according to whether the multimedia area is valid, the present disclosure can ensure unblocked transmission of the critical business and prevent the display quality of the multimedia area from being affected to improve system performance and user experience.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

Figure 1:
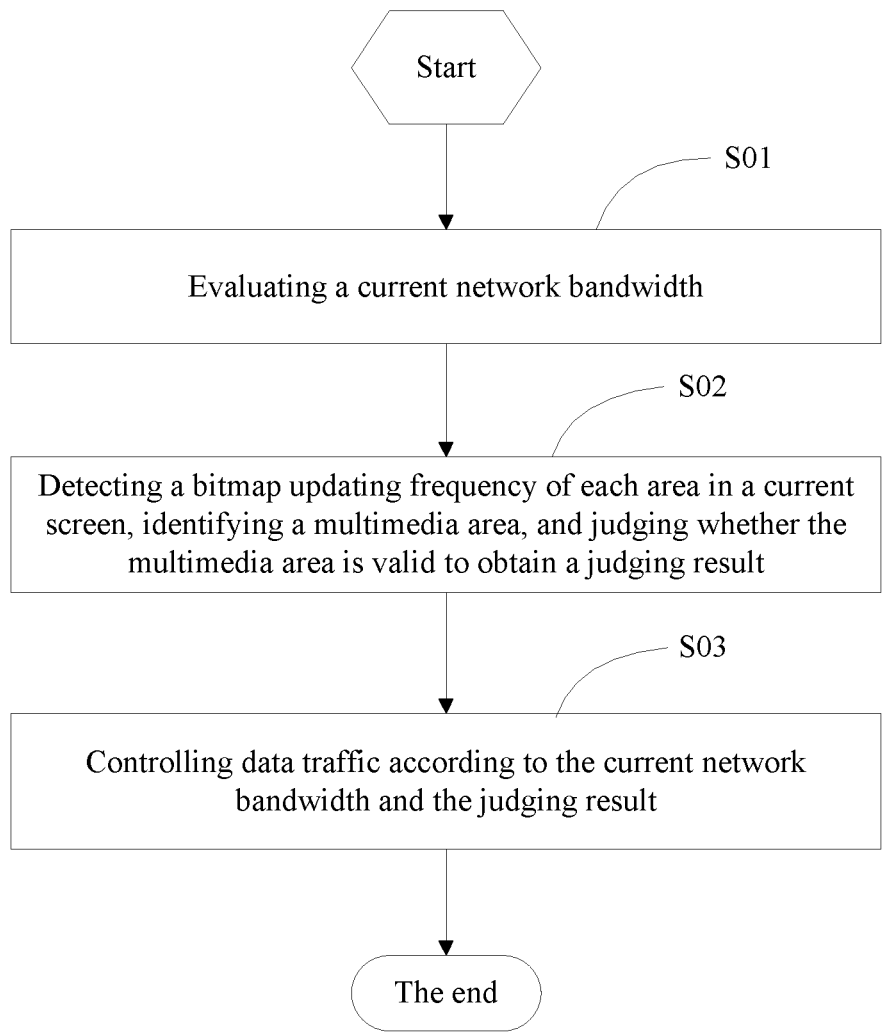
FIG. 1 is a flow chart of a traffic controlling method based on remote applications in accordance with an embodiment of the present disclosure.

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

In a traffic controlling method and traffic controlling device based on remote applications of the present disclosure, remote applications belong to application virtualization technologies. The remote applications separate human-machine interaction logic of applications from computational logic, wherein the human-machine interaction logic refer to application interfaces, operations of keyboards and mouse, audio inputs and outputs, card readers, and printing inputs, etc. When a user accesses a server virtualization application, the user only needs to transmit the human-machine interaction logic to a server side through remote desktop protocols such as RDP/ICA (Remote Desktop Protocols/Independent Computing Architecture). The server side thereafter creates an independent conversation space for the user. The computational logic of the application will be executed in the conversation space, and the changed human-machine interaction logic is transmitted to a client side and is displayed in the corresponding equipment of the client side, allowing the user to feel like accessing a local application. The virtualization technology of executing the application in the server side from the client side is the remote application.

Since in practical applications of most companies, most of videos and animations are not critical business, thus, declines of the qualities of the videos and animations generally do not practically affect the uses of official applications. Therefore, in rich media scenes, some technical means can be applied to limit the network traffic consumption of multimedia and thus to guarantee unblocked transmission of the critical business. The rich media scenes refer to the multimedia scenes having a large number of videos, animations and images, etc.

All processes of the traffic controlling method and device based on remote applications of the present disclosure are finished in the remote application server side and are not related to the performance of the remote application client side, therefore, the performance losses of a thin client and most of mobile terminal equipments can be reduced. The thin client means a business PC specifically used in small industries and based on standard design of the PC (Personal Computer) industrial that uses a professional embedded processor, a small-sized local flash, and a simplified operation system. The configuration of the thin client includes the professional embedded processor having low power consumption and high calculating functions, the local flash unremovedly used for storing the operation system, a local system memory, a network adapter, a display card, and other peripheral standard input and output devices. The thin client does not include any removal component and thus is capable of providing a using environment which is safer and securer than that provided by an ordinary PC, and providing a lower power consumption and a higher security.

Referring to FIG. 1, which is a flow chart of a traffic controlling method based on remote applications in accordance with an embodiment of the present disclosure. As shown in FIG. 1, the traffic controlling method based on remote applications includes the following steps.

Step S01, evaluating a current network bandwidth.

The current network bandwidth is evaluated by the system in many ways. In a preferred embodiment, the current network bandwidth can be evaluated in the following way.

Counting an amount of data transmitted in a TCP transport layer in a predetermined period of time; evaluating the current network bandwidth according to whether there has been a congestion in the TCP transport layer, wherein the amount of data transmitted in the predetermined period of time can be the amount of data transmitted in the TCP transport layer per second of the several seconds before the time point when the current network bandwidth is evaluated; comparing an amount of data that is currently being outputted from the network with a threshold value of the current network bandwidth, if the amount of data currently being outputted is greater than the threshold value of the current network bandwidth, it means that the current network transmission of the remote application may not respond in time very likely, thus, non-critical contents currently being transmitted are needed to be filtered to guarantee the unblocked transmission of the critical business. In a preferred embodiment, the amount of data currently being outputted refers to an amount of bitmap data outputted from a display driver.

It is understood that the way of evaluating the current network bandwidth is not related to the reasons causing the congestion in the network, after the amount of the transmitted data is reduced, the network congestion of any type can be eased, regardless of the congestion caused by the network or the congestion caused by a low processing speed of the opposite end or the congestion caused by other reasons.

It is understood that the way of evaluating the current network bandwidth is not limited in this embodiment, provided that a result which is capable of showing whether the current network bandwidth can meet the transmission requirements or not can be obtained. The specific evaluating way of the current network bandwidth is not limited in the present disclosure.

Step S02, detecting a bitmap updating frequency of each area in a current screen, identifying a multimedia area, and judging whether the multimedia area is valid to obtain a judging result.

Detecting the bitmap updating frequency of each area in the current screen of the remote application, identifying the multimedia area: a bitmap image is also known as a pixel image or a drawing image, and the bitmap image is composed of a number of individual spots known as pixels (image elements). The spots can be arranged in different ways and can be colored to form an image. When the bitmap image is magnified, countless individual blocks forming the whole image become visible. Thus, the multimedia area can be identified by detecting the bitmap updating frequency of each area.

After the multimedia area is identified, whether the multimedia area is a specific type of window is judged by eliminating areas having GDI (Graphics Device Interface) commands and by combining windows systems, thereby accurately judging whether the multimedia area is valid and obtaining the judging result. The judging result includes: the multimedia area is valid and the multimedia is invalid.

Step S03, controlling data traffic according to the current network bandwidth and the judging result.

In a situation where the network bandwidth is good and the performance of the client side is good, in order to keep good user experience, the contents of the remote application server side is not filtered; while in a situation where the network bandwidth is poor, that is, the non-critical contents currently being transmitted need to be filtered due to the evaluated current network bandwidth, content filtering is automatically initialized according to the judging result to optimize the contents of the multimedia area, thereby guaranteeing the unblocked transmission of the critical business. Specifically, if the multimedia area is valid, the non-critical contents outside the valid multimedia area are filtered; if the multimedia area is invalid, multi-frame emersion and compression are performed to the contents of the invalid multimedia area, and the transmission of the processed data is delayed. In a preferred embodiment, more specifically, multi-frame merging and lossy compression at a high compression ratio are performed to the contents of the invalid multi-media area, and a timer is simultaneously initialized. After the timer reaches the predetermined time, that is, when the timer times out, the processed image data is transmitted to the client side to further reduce the network bandwidth without affecting the display quality of the non-multimedia area.

Figure 2:
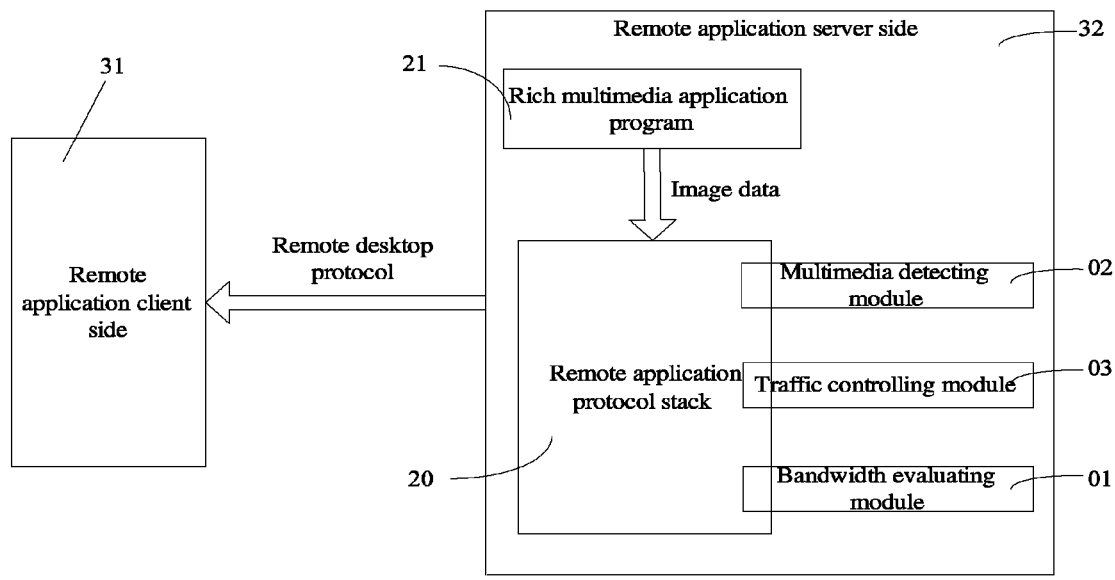
FIG. 2 is a schematic view of a traffic controlling system based on remote applications for applying the traffic controlling method of FIG. 1.

Referring to FIG. 2, which is a schematic view of a system applying the traffic controlling method based on remote applications of the present disclosure. As shown in FIG. 2, the remote application client side 31 interacts with the remote application server side 32 through remote desktop protocols. When a rich multimedia application program 21 of the remote application server side 32 transmits a large amount of image data to the remote application protocol stack 20 of the remote application server side 32. The remote application protocol stack 20 includes a bandwidth evaluating module 01, a multimedia detecting module 02 and a traffic controlling module 03. The remote application protocol stack 20 processes the image data according to the traffic controlling method based on remote applications of the present disclosure, that is, the bandwidth evaluating module 01 evaluates a current network bandwidth; the multimedia detecting module 02 detects a bitmap updating frequency of each area in a current screen, identifying a multimedia area, and judging whether the multimedia area is valid to obtain a judging result; and the traffic controlling module 03 controls data traffic according to the current network bandwidth and the judging result, thereby guaranteeing the unblocked transmission of the critical business. Since all processes of the traffic controlling method based on remote applications are finished in the remote application server side 32 and are not related to the performance of the remote application client side 31, thus, the performance losses of the thin client and a part of the mobile equipments can be reduced.

By evaluating the current network bandwidth, detecting the updating frequency of each area in the current screen and identifying whether the multimedia area is valid, and dynamically controlling the data traffic according to the current network bandwidth and according to whether the multimedia area is valid, the present disclosure can ensure the unblocked transmission of the critical business and prevent the display quality of the multimedia area from being affected to improve the system performance and the user experience.

Figure 3:
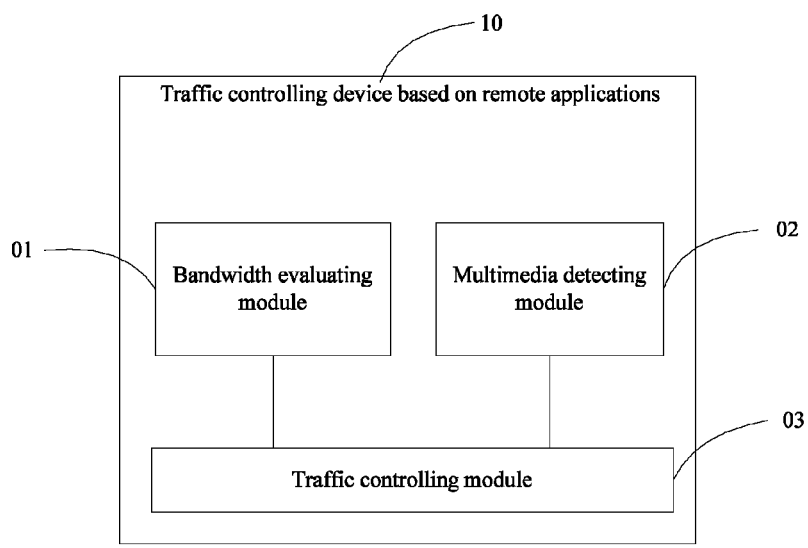
FIG. 3 is a traffic controlling device based on remote applications in accordance with an embodiment of the present disclosure.

The present disclosure further provides a traffic controlling device 10 based on remote applications. Referring to FIG. 3, which is a schematic view of a traffic controlling device 10 based on remote applications, the traffic controlling device 10 includes a bandwidth evaluating module 01, a multimedia detecting module 02, and a traffic controlling module 03. The modules 01-03 may comprise computerized instructions in the form of one or more programs that are stored in a storage system and executed by at least one processor to provide functions for implementing the modules. In general, the word "module", as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives. A detailed description of each module will be given.

The bandwidth evaluating module 01 is configured for evaluating a current network bandwidth.

The bandwidth evaluating module 01 of the remote application server side evaluates the current network bandwidth in a number of ways. In a preferred embodiment, the bandwidth evaluating module 01 evaluates the current network bandwidth in the following way.

The bandwidth evaluating module 01 counts an amount of data transmitted in a TCP transport layer in a predetermined period of time; evaluates the current network bandwidth according to whether there has been a congestion in the TCP transport layer, wherein the amount of data transmitted in the predetermined period of time can be the amount of data transmitted in the TCP transport layer per second of the several seconds before the time point when current network bandwidth is evaluated; compares the amount of data that is currently being outputted from the network with a threshold value of the current network bandwidth. If the amount of data currently being outputted is greater than the threshold value of the current network bandwidth, it means that the current network transmission of the remote application may not respond in time very likely, thus, non-critical contents currently being transmitted are needed to be filtered to guarantee the unblocked transmission of the critical business. In a preferred embodiment, the amount of data currently being outputted refers to an amount of bitmap data outputted from a display driver.

The bandwidth evaluating module 01 is configured for evaluating the current network bandwidth.

It is understood that the way the bandwidth evaluating module 01 evaluates the current network bandwidth is not related to the reasons causing the network congestion. After the amount of the transmitted data is reduced, the network congestion of any type can be eased, regardless of the congestion caused by the network or the congestion caused by a low processing speed of the opposite end or the congestion caused by other reasons.

It is understood that the way the bandwidth valuating module 01 evaluates the current network bandwidth is not limited in this embodiment, provided that a result which is capable of showing whether the current network bandwidth can meet the transmission requirements or not can be obtained. The specific way that the bandwidth evaluating module 01 evaluates the current network bandwidth is not limited in the present disclosure.

The multimedia detecting module 02 is configured for detecting a bitmap updating frequency of each area in a current screen and identifying a multimedia area. A bitmap image is known as a pixel image or a drawing image, and the bitmap image is composed of a number of individual spots known as pixels (image elements). The spots can be arranged in different ways and can be colored to form an image. When the bitmap image is magnified, countless individual blocks forming the whole image become visible. Thus, the multimedia detecting module 02 can identify the multimedia area by detecting the bitmap updating frequency of each area.

After the multimedia detecting module 02 identifies the multimedia area, the multimedia detecting module 02 judges whether the multimedia area is a specific type of window by eliminating areas having GDI (Graphics Device Interface) commands and by combining windows systems. The multimedia detecting module 02 thus can accurately judge whether the multimedia area is valid and obtain the judging result. The judging result includes: the multimedia area is valid and the multimedia area is invalid.

The traffic controlling module 03 is configured for controlling data traffic according to the current network bandwidth and the judging result.

In a situation where the network bandwidth is good and the performance of the client side is good, in order to keep good user experience, the traffic controlling module 03 does not filter the contents of the remote application server side; while in a situation where the network bandwidth is poor, that is, the non-critical contents currently being transmitted need to be filtered due to the evaluated current network bandwidth, the traffic controlling module 03 automatically initializes content filtering according to the judging result to optimize the contents of the multimedia area, thereby guaranteeing the unblocked transmission of the critical business.

Specifically, if the multimedia detecting module 02 determines that the multimedia area is valid, the traffic controlling module 03 filters the non-critical contents outside the valid multimedia area; if the multimedia detecting module 02 determines that the multimedia area is invalid, the traffic controlling module 03 performs multi-frame emersion and compression to the contents of the invalid multimedia area, and delays the transmission of the processed data. In a preferred embodiment, the traffic controlling module 03 performs multi-frame merging and lossy compression at a high compression ratio to the contents of the invalid multimedia area, and simultaneously initializes a timer. After the timer reaches the predetermined time, that is, when the timer times out, the traffic controlling module 03 transmits the processed image data to the client side to further reduce the network bandwidth without affecting the display quality of the non-multimedia area.

Referring to FIG. 2 and FIG. 3, FIG. 2 is a schematic view of a system applying the traffic controlling device 10 based on remote applications of the present disclosure. As shown in FIG. 2, the remote application client side 31 interacts with the remote application server side 32 through remote desktop protocols. When a rich multimedia application program 21 of the remote application server side 32 transmits a large amount of image data to the remote application protocol stack 20 of the remote application server side 32. The remote application protocol stack 20 includes a bandwidth evaluating module 01, a multimedia detecting module 02 and a traffic controlling module 03. The remote application protocol stack 20 processes the image data according to the traffic controlling method based on remote applications of the present disclosure, that is, the bandwidth evaluating module 01 evaluates a current network bandwidth; the multimedia detecting module 02 detects a bitmap updating frequency of each area in a current screen, identifying a multimedia area, and judging whether the multimedia area is valid to obtain a judging result; and the traffic controlling module 03 controls data traffic according to the current network bandwidth and the judging result, thereby guaranteeing the unblocked transmission of the critical business. Since the traffic controlling device 10 based on remote applications of the present disclosure is configured in the remote application server side 32, thus, all processes of the traffic controlling device 10 are finished in the remote application server side 32 and are not related to the performance of the remote application client side 31, thus, the performance losses of the thin client and a part of the mobile equipments can be reduced.

By evaluating the current network bandwidth, detecting the updating frequency of each area in the current screen and identifying whether the multimedia area is valid, and dynamically controlling the data traffic according to the current network bandwidth and according to whether the multimedia area is valid, the present disclosure is capable of ensuring the unblocked transmission of the critical business and preventing the display quality of the multimedia area from being affected to improve the system performance and the user experience.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A traffic controlling method based on remote applications, comprising the following steps:

evaluating a current network bandwidth to obtain an evaluating result;

detecting a bitmap updating frequency of each area in a current screen, identifying a multimedia area, and by eliminating area having graphics device interface commands and by combining windows systems, judging whether the multimedia area is valid or not to obtain a judging result; and controlling data traffic according to the evaluating result and the judging result;

wherein the step of controlling data traffic according to the evaluating result and the judging result comprises:

if the evaluating result of the current network bandwidth indicates that non-critical contents currently being transmitted are needed to be filtered, optimizing contents of the multimedia area according to the judging result;

wherein the step of optimizing contents of the multimedia area according to the judging result comprises:

if the multimedia area is valid, filtering the non-critical contents outside the valid multimedia area;

if the multimedia area is invalid, performing multi-frame merging and compression to the contents of the invalid multimedia area, simultaneously initializing a timer and transmitting the processed data after the timer reaches a predetermined time.

2. The method of claim 1, wherein the step of evaluating a current network bandwidth comprises:

evaluating the current network bandwidth according to an amount of data transmitted in a transmission control protocol (TCP) transport layer in a predetermined period of time and according to whether there has been a congestion in the TCP transport layer;

comparing an amount of data that is currently being outputted from the current network and a threshold value of the current network bandwidth; and if the amount of data currently being outputted is greater than the threshold value, filtering the non-critical contents currently being transmitted.

3. A traffic controlling device based on remote applications, comprising:

a processor; and a memory;

where the processor executes instructions stored in the memory to implement a bandwidth evaluating module configured for evaluating a current network bandwidth to obtain an evaluating result; a multimedia detecting module configured for detecting a bitmap updating frequency of each area in a current screen, identifying a multimedia area, and by eliminating area having graphics device interface commands and by combining windows systems, judging whether the multimedia area is valid to obtain a judging result; and a traffic controlling module configured for controlling data traffic according to the evaluating result and the judging result;

wherein the traffic controlling module controlling data traffic according to the evaluating result and the judging result comprises:

if the evaluating result of the current network bandwidth indicates that non-critical contents currently being transmitted are needed to be filtered, optimizing contents of the multimedia area according to the judging result;

wherein the traffic controlling module optimizing the contents of the multimedia area according to the judging result comprises:

if the multimedia area is valid, the traffic controlling module filters the non-critical contents outside the valid multimedia area; and if the multimedia area is invalid, the traffic controlling module performs multi-frame merging and compression to the contents of the invalid multimedia area, simultaneously initializes a timer, and transmits the processed data after the timer reaches a predetermined time.

4. The device of claim 3, wherein the bandwidth evaluating module is specifically used for:

evaluating the current network bandwidth according to an amount of data transmitted in a transmission control protocol (TCP) transport layer in a predetermined period of time and according to whether there has been a congestion in the TCP transport layer;

comparing an amount of data that is currently being outputted from the network and a threshold value of the current network bandwidth; and if the amount of data currently being outputted is greater than the threshold value, filtering the non-critical contents currently being transmitted.

* * * * *